United States Patent
Zhang et al.

(10) Patent No.: US 11,119,482 B2
(45) Date of Patent: Sep. 14, 2021

(54) SYSTEM AND METHOD FOR CONTROL OF AN AUTONOMOUS VEHICLE

(71) Applicant: GM GLOBAL TECHNOLOGY OPERATIONS LLC, Detroit, MI (US)

(72) Inventors: Qi Zhang, Beverly Hills, MI (US); Ping Hwang, New Hudson, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 321 days.

(21) Appl. No.: 16/269,800

(22) Filed: Feb. 7, 2019

(65) Prior Publication Data

US 2020/0257291 A1 Aug. 13, 2020

(51) Int. Cl.
*G05D 1/00* (2006.01)
*B60W 40/114* (2012.01)
(Continued)

(52) U.S. Cl.
CPC ......... *G05D 1/0088* (2013.01); *B60W 40/101* (2013.01); *B60W 40/105* (2013.01); *B60W 40/114* (2013.01); *B60W 50/00* (2013.01); *G05B 6/02* (2013.01); *G05D 1/0212* (2013.01); *B60W 2050/001* (2013.01); *B60W 2050/0011* (2013.01); *B60W 2050/0031* (2013.01);
(Continued)

(58) Field of Classification Search
CPC .............. G05D 1/0088; G05D 1/0212; G05D 2201/0213; B60W 40/114; B60W 40/101; B60W 50/00; B60W 40/105; B60W 2520/14; B60W 2520/12; B60W 2520/10; B60W 2050/0011; B60W 2050/0031; B60W 2050/001; B60W 2050/0078; B60W 2520/20; B60W 2540/18; B60W 40/10; B60W 10/20; B60W 10/06; B60W 10/10; B60W 10/184; B60W 2520/26; B60W 2710/06; B60W 2710/1005; B60W 2710/18; B60W 2710/20; G05B 6/02; G06N 20/00; B62D 6/003; B62D 15/025

See application file for complete search history.

(56) References Cited

U.S. PATENT DOCUMENTS

| | | | | |
|---|---|---|---|---|
| 5,747,682 | A * | 5/1998 | Hirano | B60T 8/17551 73/115.07 |
| 2004/0236490 | A1* | 11/2004 | Kin | B60W 30/045 701/70 |

(Continued)

*Primary Examiner* — Sze-Hon Kong

(57) ABSTRACT

An automotive vehicle includes an actuator configured to control vehicle steering, a sensor configured to detect a yaw rate of the vehicle, and a controller. The controller is configured to estimate a yaw rate and lateral velocity of the vehicle via a vehicle dynamics model based on a measured longitudinal velocity of the vehicle, calculated road wheel angles of the vehicle, and estimated tire slip angles of the vehicle. The controller is configured to receive a measured yaw rate from the sensor, and to calculate a difference between the measured yaw rate and the estimated yaw rate. The controller is configured to apply a model correction to the vehicle dynamics model using a PID controller based on the difference, and to estimate a vehicle position based on the estimated lateral velocity and the measured longitudinal velocity. The controller is configured to automatically control the actuator based on the vehicle position.

12 Claims, 4 Drawing Sheets

(51) Int. Cl.
  *B60W 40/101*   (2012.01)
  *B60W 50/00*    (2006.01)
  *B60W 40/105*   (2012.01)
  *G05B 6/02*     (2006.01)
  *G05D 1/02*     (2020.01)
  *G06N 20/00*    (2019.01)

(52) U.S. Cl.
  CPC . *B60W 2050/0078* (2013.01); *B60W 2520/10* (2013.01); *B60W 2520/12* (2013.01); *B60W 2520/14* (2013.01); *B60W 2520/20* (2013.01); *B60W 2540/18* (2013.01); *G05D 2201/0213* (2013.01); *G06N 20/00* (2019.01)

(56) References Cited

U.S. PATENT DOCUMENTS

| | | | |
|---|---|---|---|
| 2005/0154513 A1* | 7/2005 | Matsunaga | B60W 30/045 701/38 |
| 2009/0171526 A1* | 7/2009 | Takenaka | B60W 10/18 701/70 |
| 2011/0251748 A1* | 10/2011 | Moran | B60W 30/18118 701/31.4 |
| 2013/0144476 A1* | 6/2013 | Pinto | B60T 8/17555 701/22 |
| 2016/0229394 A1* | 8/2016 | Fujii | B60K 28/10 |
| 2018/0086374 A1* | 3/2018 | Sato | B62D 1/20 |
| 2020/0039523 A1* | 2/2020 | Ghasemalizadeh | B62D 6/00 |
| 2020/0172164 A1* | 6/2020 | Mitsumoto | B62D 6/04 |
| 2020/0172165 A1* | 6/2020 | Chen | B62D 15/025 |
| 2021/0009115 A1* | 1/2021 | Ohmura | B60W 40/04 |

* cited by examiner

SYSTEM AND METHOD FOR CONTROL OF AN AUTONOMOUS VEHICLE

INTRODUCTION

The present disclosure relates to vehicles having sensor suites, e.g. those controlled by automated driving systems configured to automatically control vehicle steering, acceleration, and braking during a drive cycle without human intervention.

The operation of modern vehicles is becoming more automated, i.e. able to provide driving control with less and less driver intervention. Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels. As automation levels increase, sensor precision and confidence requirements likewise increase.

SUMMARY

An automotive vehicle according to the present disclosure includes an actuator configured to control vehicle steering, a sensor configured to detect a yaw rate of the vehicle, and a controller. The controller is configured to estimate a yaw rate and lateral velocity of the vehicle via a vehicle dynamics model based on a measured longitudinal velocity of the vehicle, calculated road wheel angles of the vehicle, and estimated tire slip angles of the vehicle. The controller is also configured to receive a measured yaw rate from the sensor, and to calculate a difference between the measured yaw rate and the estimated yaw rate. The controller is additionally configured to apply a model correction to the vehicle dynamics model using a PID controller based on the difference, and to estimate a vehicle position based on the estimated lateral velocity and the measured longitudinal velocity. The controller is further configured to automatically control the actuator based on the vehicle position.

In an exemplary embodiment, the vehicle additionally includes a GNSS receiver configured to provide a position of the vehicle. In such embodiments, the controller is configured to estimate the vehicle position based on the estimated lateral velocity and the measured longitudinal velocity in further response to a position from the GNSS receiver being unavailable.

In an exemplary embodiment, the PID controller is a PI controller.

A method of controlling a ground vehicle according to the present disclosure includes providing the vehicle with an actuator configured to control vehicle steering, at least one sensor configured to detect a yaw rate of the vehicle and a longitudinal velocity of the vehicle, and a controller in communication with the sensor and the controller. The method additionally includes receiving, via the at least one sensor, a measured longitudinal velocity and a measured yaw rate. The method also includes estimating, via the controller, a yaw rate and lateral velocity of the vehicle using a vehicle dynamics model based on the measured longitudinal velocity, calculated road wheel angles of the vehicle, and estimated tire slip angles of the vehicle. The method further includes calculating, via the controller, a difference between the measured yaw rate and the estimated yaw rate, and applying, via the controller, a model correction to the vehicle dynamics model using a PID controller based on the difference. The method further includes estimating, via the controller, a vehicle position based on the estimated lateral velocity and the measured longitudinal velocity, and automatically controlling the actuator, via the controller, based on the vehicle position.

In an exemplary embodiment, the method additionally includes providing the vehicle with a GNSS receiver configured to provide a position of the vehicle. In such embodiments, estimating the vehicle position based on the estimated lateral velocity and the measured longitudinal velocity is in response to a position from the GNSS receiver being unavailable.

In an exemplary embodiment, the PID controller is a PI controller.

In an exemplary embodiment, the method additionally includes identifying tuning constants of the PID controller via machine learning.

A control system for a vehicle according to the present disclosure includes a first calculation module, a second calculation module, a vehicle dynamics model, a path planning module, and a vehicle control module. The first calculation module is configured to receive a measured steering angle and determine a calculated road wheel angle based on the measured steering angle. The second calculation module is configured to determine a calculated tire slip angle based on a measured longitudinal velocity, a measured yaw rate, and a calculated lateral velocity. The vehicle dynamics model is configured to determine a calculated yaw rate, the calculated lateral velocity, and a calculated position of the vehicle based on the measured longitudinal velocity of the vehicle, the calculated road wheel angle, and the calculated tire slip angle. The PID controller is configured to apply a model correction to the vehicle dynamics model based on a difference between the measured yaw rate and the calculated yaw rate. The path planning module is configured to determine a vehicle path to be followed based on the calculated position of the vehicle. The vehicle control module is configured to automatically control a steering actuator based on the vehicle path.

In an exemplary embodiment, the control system additionally includes a vehicle steering system. In such embodiment, the steering actuator is operable to automatically control the vehicle steering system without operator input.

In an exemplary embodiment, the control system additionally includes a GNSS receiver configured to provide a position of the vehicle. In such embodiments, the path planning module is configured to determine a vehicle path to be followed based on the calculated position of the vehicle in response to a position from the GNSS receiver being unavailable.

In an exemplary embodiment, the PID controller is a PI controller.

In an exemplary embodiment, the control system additionally includes a coordinate alignment module configured to convert the calculated position of the vehicle from a first coordinate system to a second coordinate system.

Embodiments according to the present disclosure provide a number of advantages. For example, the present disclosure provides a system and method for calculating vehicle position using an accurate and computationally-efficient control. Moreover, the present disclosure provides a method for automatically using such a control when desirable based on the condition of one or more primary positioning sensors, thereby increasing robustness and reliability of the system and, in turn, increasing customer satisfaction.

The above and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
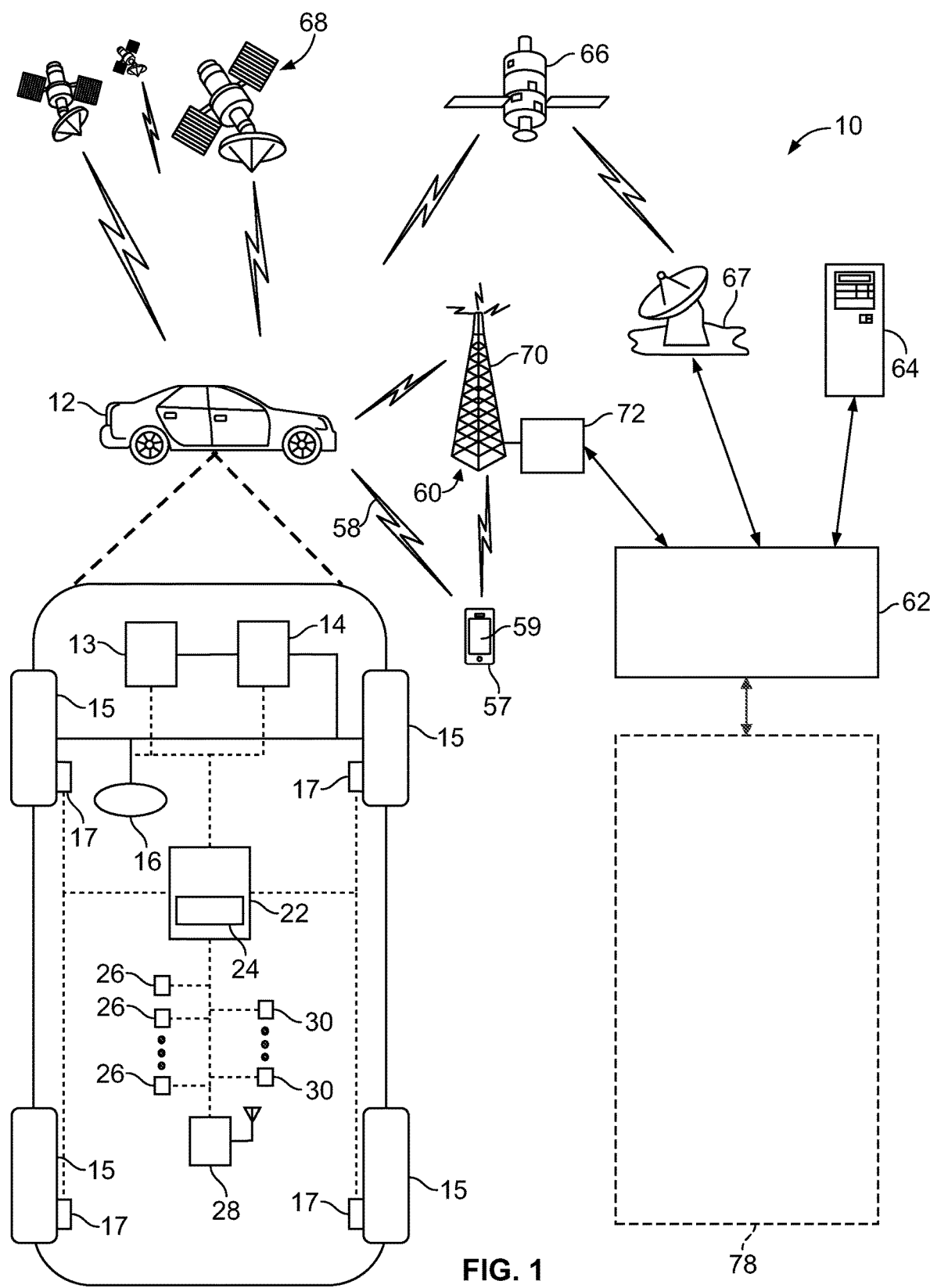
FIG. 1 is a schematic diagram of a communication system including an autonomously controlled vehicle according to an embodiment of the present disclosure.

FIG. 1 schematically illustrates an operating environment that comprises a mobile vehicle communication and control system 10 for a motor vehicle 12. The motor vehicle 12 may be referred to as a host vehicle. The communication and control system 10 for the host vehicle 12 generally includes one or more wireless carrier systems 60, a land communications network 62, a computer 64, a mobile device 57 such as a smart phone, and a remote access center 78.

The host vehicle 12, shown schematically in FIG. 1, is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. The host vehicle has a body with a fore-aft longitudinal axis and a side-to-side lateral axis.

The host vehicle 12 includes a propulsion system 13, which may in various embodiments include an internal combustion engine, an electric machine such as a traction motor, and/or a fuel cell propulsion system.

The host vehicle 12 also includes a transmission 14 configured to transmit power from the propulsion system 13 to a plurality of vehicle wheels 15 according to selectable speed ratios. According to various embodiments, the transmission 14 may include a step-ratio automatic transmission, a continuously-variable transmission, or other appropriate transmission. The host vehicle 12 additionally includes wheel brakes 17 configured to provide braking torque to the vehicle wheels 15. The wheel brakes 17 may, in various embodiments, include friction brakes, a regenerative braking system such as an electric machine, and/or other appropriate braking systems.

The host vehicle 12 additionally includes a steering system 16. While depicted as including a steering wheel for illustrative purposes, in some embodiments contemplated within the scope of the present disclosure, the steering system 16 may not include a steering wheel.

The host vehicle 12 includes a wireless communications system 28 configured to wirelessly communicate with other vehicles ("V2V") and/or infrastructure ("V2I"). In an exemplary embodiment, the wireless communication system 28 is configured to communicate via a dedicated short-range communications (DSRC) channel. DSRC channels refer to one-way or two-way short-range to medium-range wireless communication channels specifically designed for automotive use and a corresponding set of protocols and standards. However, wireless communications systems configured to communicate via additional or alternate wireless communications standards, such as IEEE 802.11 ("WiFi™") and cellular data communication, are also considered within the scope of the present disclosure.

The propulsion system 13, transmission 14, steering system 16, and wheel brakes 17 are in communication with or under the control of at least one controller 22. While depicted as a single unit for illustrative purposes, the controller 22 may additionally include one or more other controllers, collectively referred to as a "controller." The controller 22 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle.

The controller 22 includes an automated driving system (ADS) 24 for automatically controlling various actuators in the vehicle. In an exemplary embodiment, the ADS 24 is a so-called Level Four or Level Five automation system. A Level Four system indicates "high automation", referring to the driving mode-specific (e.g. within defined geographic boundaries) performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

Other embodiments according to the present disclosure may be implemented in conjunction with so-called Level One, Level Two, or Level Three automation systems. A Level One system indicates "driver assistance", referring to the driving mode-specific execution by a driver assistance system of either steering or acceleration using information about the driving environment and with the expectation that the human driver performs all remaining aspects of the dynamic driving task. A Level Two system indicates "Partial Automation", referring to the driving mode-specific execution by one or more driver assistance systems of both steering and acceleration using information about the driving environment and with the expectation that the human driver performs all remaining aspects of the dynamic driving task. A Level Three system indicates "Conditional Automation", referring to the driving mode-specific performance by an automated driving system of all aspects of the dynamic driving task with the expectation that the human driver will respond appropriately to a request to intervene.

In an exemplary embodiment, the ADS 24 is configured to control the propulsion system 13, transmission 14, steering system 16, and wheel brakes 17 to control vehicle acceleration, steering, and braking, respectively, without human intervention via a plurality of actuators 30 in response to inputs from a plurality of sensors 26, which may include GNSS (global navigation satellite system, e.g. GPS and/or GLONASS), RADAR, LIDAR, optical cameras, thermal cameras, ultrasonic sensors, and/or additional sensors as appropriate.

FIG. 1 illustrates several networked devices that can communicate with the wireless communication system 28 of the host vehicle 12. One of the networked devices that can communicate with the host vehicle 12 via the wireless communication system 28 is the mobile device 57. The mobile device 57 can include computer processing capability, a transceiver capable of communicating signals 58 using a short-range wireless protocol, and a visual smart phone display 59. The computer processing capability includes a microprocessor in the form of a programmable device that includes one or more instructions stored in an internal memory structure and applied to receive binary input to create binary output. In some embodiments, the mobile device 57 includes a GPS module capable of receiving signals from GPS satellites 68 and generating GPS coordinates based on those signals. In other embodiments, the mobile device 57 includes cellular communications functionality such that the mobile device 57 carries out voice and/or data communications over the wireless carrier system 60 using one or more cellular communications protocols, as are discussed herein. The mobile device 57 may also include other sensors, including but not limited to, accelerometers capable of measuring motion of the mobile device 57 along six axes. The visual smart phone display 59 may also include a touch-screen graphical user interface.

The wireless carrier system 60 is preferably a cellular telephone system that includes a plurality of cell towers 70 (only one shown), one or more mobile switching centers (MSCs) 72, as well as any other networking components required to connect the wireless carrier system 60 with the land communications network 62. Each cell tower 70 includes sending and receiving antennas and a base station, with the base stations from different cell towers being connected to the MSC 72 either directly or via intermediary equipment such as a base station controller. The wireless carrier system 60 can implement any suitable communications technology, including for example, analog technologies such as AMPS, or digital technologies such as CDMA (e.g., CDMA2000) or GSM/GPRS. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from using the wireless carrier system 60, a second wireless carrier system in the form of satellite communication can be used to provide unidirectional or bidirectional communication with the host vehicle 12. This can be done using one or more communication satellites 66 and an uplink transmitting station 67. Unidirectional communication can include, for example, satellite radio services, wherein programming content (news, music, etc.) is received by the transmitting station 67, packaged for upload, and then sent to the satellite 66, which broadcasts the programming to subscribers. Bidirectional communication can include, for example, satellite telephony services using the satellite 66 to relay telephone communications between the host vehicle 12 and the station 67. The satellite telephony can be utilized either in addition to or in lieu of the wireless carrier system 60.

The land network 62 may be a conventional land-based telecommunications network connected to one or more landline telephones and connects the wireless carrier system 60 to the remote access center 78. For example, the land network 62 may include a public switched telephone network (PSTN) such as that used to provide hardwired telephony, packet-switched data communications, and the Internet infrastructure. One or more segments of the land network 62 could be implemented through the use of a standard wired network, a fiber or other optical network, a cable network, power lines, other wireless networks such as wireless local area networks (WLANs), or networks providing broadband wireless access (BWA), or any combination thereof. Furthermore, the remote access center 78 need not be connected via land network 62, but could include wireless telephony equipment so that it can communicate directly with a wireless network, such as the wireless carrier system 60.

While shown in FIG. 1 as a single device, the computer 64 may include a number of computers accessible via a private or public network such as the Internet. Each computer 64 can be used for one or more purposes. In an exemplary embodiment, the computer 64 may be configured as a web server accessible by the host vehicle 12 via the wireless communication system 28 and the wireless carrier 60. Other computers 64 can include, for example: a service center computer where diagnostic information and other vehicle data can be uploaded from the vehicle via the wireless communication system 28 or a third party repository to or from which vehicle data or other information is provided, whether by communicating with the host vehicle 12, the remote access center 78, the mobile device 57, or some combination of these. The computer 64 can maintain a searchable database and database management system that permits entry, removal, and modification of data as well as the receipt of requests to locate data within the database. The computer 64 can also be used for providing Internet connectivity such as DNS services or as a network address server that uses DHCP or other suitable protocol to assign an IP address to the host vehicle 12. The computer 64 may be in communication with at least one supplemental vehicle in addition to the host vehicle 12. The host vehicle 12 and any supplemental vehicles may be collectively referred to as a fleet. In an exemplary embodiment, the computer 64 is configured to store, e.g. in non-transient data memory, subscriber account information and/or vehicle information. The subscriber account information can include, but is not limited to, biometric data, password information, subscriber preferences, and learned behavioral patterns of users or occupants of vehicles in the fleet. The vehicle information can include, but is not limited to, vehicle attributes such as color, make, model, license plate number, notification light pattern, and/or frequency identifiers.

Figure 2:
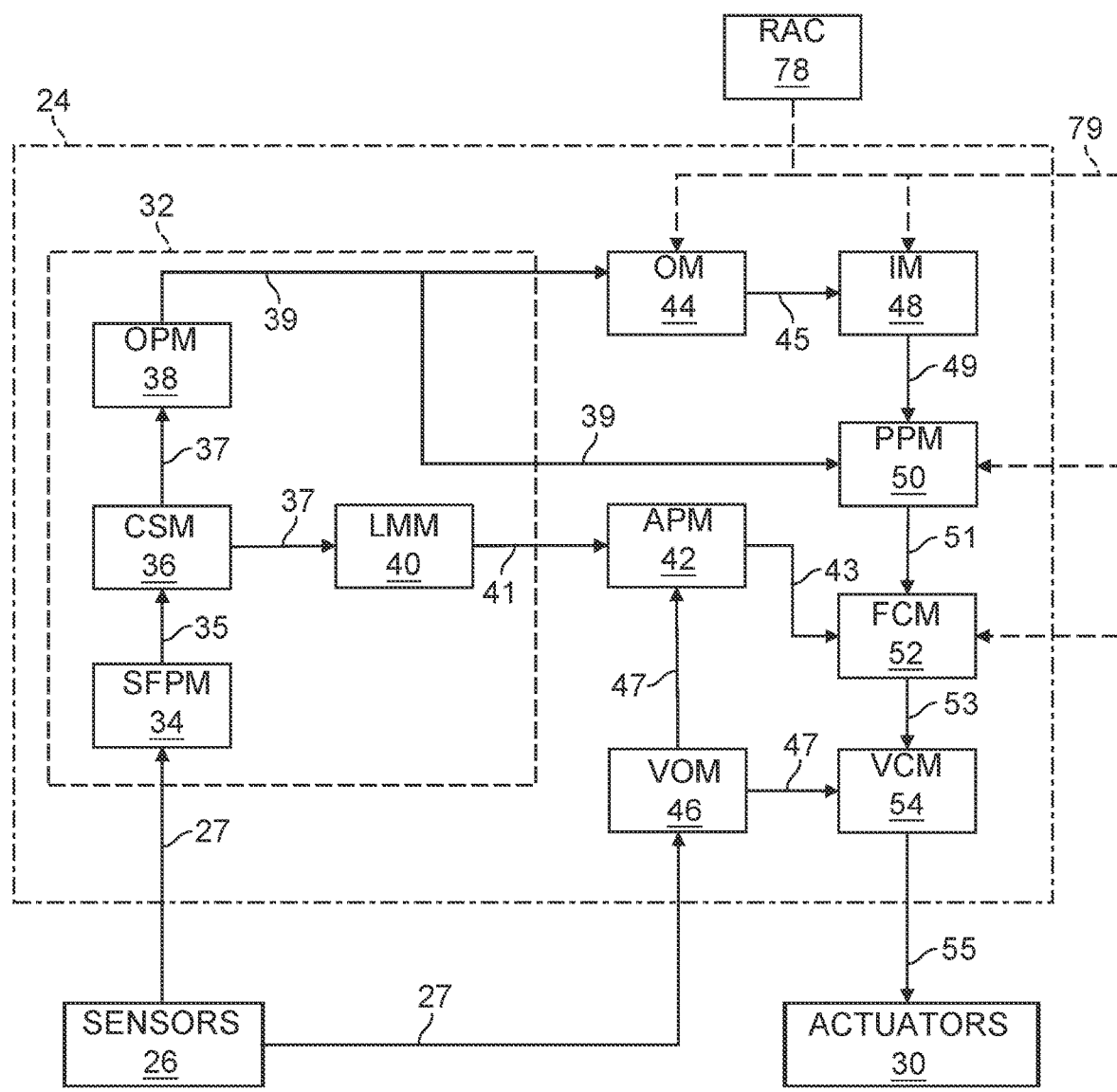
FIG. 2 is a schematic block diagram of an automated driving system (ADS) for a vehicle according to an embodiment of the present disclosure.

As shown in FIG. 2, the ADS 24 includes multiple distinct systems, including at least a perception system 32 for determining the presence, location, classification, and path of detected features or objects in the vicinity of the vehicle. The perception system 32 is configured to receive inputs from a variety of sensors, such as the sensors 26 illustrated in FIG. 1, and synthesize and process the sensor inputs to generate parameters used as inputs for other control algorithms of the ADS 24.

The perception system 32 includes a sensor fusion and preprocessing module 34 that processes and synthesizes sensor data 27 from the variety of sensors 26. The sensor fusion and preprocessing module 34 performs calibration of the sensor data 27, including, but not limited to, LIDAR to LIDAR calibration, camera to LIDAR calibration, LIDAR to chassis calibration, and LIDAR beam intensity calibration. The sensor fusion and preprocessing module 34 outputs preprocessed sensor output 35.

A classification and segmentation module 36 receives the preprocessed sensor output 35 and performs object classification, image classification, traffic light and sign classification, object segmentation, ground segmentation, and object tracking processes. Object classification includes, but is not limited to, identifying and classifying objects in the surrounding environment including identification and classification of traffic signals and signs, RADAR fusion and tracking to account for the sensor's placement and field of view (FOV), and false positive rejection via LIDAR fusion to eliminate the many false positives that exist in an urban environment, such as, for example, manhole covers, bridges, overhead trees or light poles, and other obstacles with a high RADAR cross section but which do not affect the ability of the vehicle to travel along its path. Additional object classification and tracking processes performed by the classification and segmentation module 36 include, but are not limited to, freespace detection and high level tracking that fuses data from RADAR tracks, LIDAR segmentation, LIDAR classification, image classification, object shape fit models, semantic information, motion prediction, raster maps, static obstacle maps, and other sources to produce high quality object tracks. The classification and segmentation module 36 additionally performs traffic control device classification and traffic control device fusion with lane association and traffic control device behavior models. The classification and segmentation module 36 generates an object classification and segmentation output 37 that includes object identification information.

A localization and mapping module 40 uses the object classification and segmentation output 37 to calculate parameters including, but not limited to, estimates of the position and orientation of the host vehicle 12 in both typical and challenging driving scenarios. These challenging driving scenarios include, but are not limited to, dynamic environments with many cars (e.g., dense traffic), environments with large scale obstructions (e.g., roadwork or construction sites), hills, multi-lane roads, single lane roads, a variety of road markings and buildings or lack thereof (e.g., residential vs. business districts), and bridges and overpasses (both above and below a current road segment of the vehicle).

The localization and mapping module 40 also incorporates new data collected as a result of expanded map areas obtained via onboard mapping functions performed by the host vehicle 12 during operation and mapping data "pushed" to the host vehicle 12 via the wireless communication system 28. The localization and mapping module 40 updates previous map data with the new information (e.g., new lane markings, new building structures, addition or removal of constructions zones, etc.) while leaving unaffected map regions unmodified. Examples of map data that may be generated or updated include, but are not limited to, yield line categorization, lane boundary generation, lane connection, classification of minor and major roads, classification of left and right turns, and intersection lane creation. The localization and mapping module 40 generates a localization and mapping output 41 that includes the position and orientation of the host vehicle 12 with respect to detected obstacles and road features.

A vehicle odometry module 46 receives data 27 from the vehicle sensors 26 and generates a vehicle odometry output 47 which includes, for example, vehicle heading and velocity information. An absolute positioning module 42 receives the localization and mapping output 41 and the vehicle odometry information 47 and generates a vehicle location output 43 that is used in separate calculations as discussed below.

An object prediction module 38 uses the object classification and segmentation output 37 to generate parameters including, but not limited to, a location of a detected obstacle relative to the vehicle, a predicted path of the detected obstacle relative to the vehicle, and a location and orientation of traffic lanes relative to the vehicle. Data on the predicted path of objects (including pedestrians, surrounding vehicles, and other moving objects) is output as an object prediction output 39 and is used in separate calculations as discussed below.

The ADS 24 also includes an observation module 44 and an interpretation module 48. The observation module 44 generates an observation output 45 received by the interpretation module 48. The observation module 44 and the interpretation module 48 allow access by the remote access center 78. The interpretation module 48 generates an interpreted output 49 that includes additional input provided by the remote access center 78, if any.

A path planning module 50 processes and synthesizes the object prediction output 39, the interpreted output 49, and additional routing information 79 received from an online database or the remote access center 78 to determine a vehicle path to be followed to maintain the vehicle on the desired route while obeying traffic laws and avoiding any detected obstacles. The path planning module 50 employs algorithms configured to avoid any detected obstacles in the vicinity of the vehicle, maintain the vehicle in a current traffic lane, and maintain the vehicle on the desired route. The path planning module 50 outputs the vehicle path information as path planning output 51. The path planning output 51 includes a commanded vehicle path based on the vehicle route, vehicle location relative to the route, location and orientation of traffic lanes, and the presence and path of any detected obstacles.

A first control module 52 processes and synthesizes the path planning output 51 and the vehicle location output 43 to generate a first control output 53. The first control module 52 also incorporates the routing information 79 provided by the remote access center 78 in the case of a remote take-over mode of operation of the vehicle.

A vehicle control module 54 receives the first control output 53 as well as velocity and heading information 47 received from vehicle odometry 46 and generates vehicle control output 55. The vehicle control output 55 includes a set of actuator commands to achieve the commanded path from the vehicle control module 54, including, but not limited to, a steering command, a shift command, a throttle command, and a brake command.

The vehicle control output 55 is communicated to actuators 30. In an exemplary embodiment, the actuators 30 include a steering control, a shifter control, a throttle control, and a brake control. The steering control may, for example, control a steering system 16 as illustrated in FIG. 1. The shifter control may, for example, control a transmission 14 as illustrated in FIG. 1. The throttle control may, for example, control a propulsion system 13 as illustrated in FIG. 1. The brake control may, for example, control wheel brakes 17 as illustrated in FIG. 1.

Robustness of sensor data is important in all vehicles, but particularly when the vehicle is under the control of the ADS 24, and thereby relying heavily upon sensor data for satisfactory operation. When the vehicle is under the control of the ADS 24 it is desirable to know the precise vehicle location relative to a desired path to enable accurate navigation and path-following behavior. However, in some driving situations such as urban canyons (e.g. when in the vicinity of tall obstructions such as buildings), obstructions may result in impaired ability to accurately determine the position of the vehicle 12 using GNSS location. Likewise, some driving situations. such as inclement weather, may impair the ability of vehicle cameras to accurately determine the position of the vehicle relative to lane markings or other indicators of desired vehicle path. It is thereby desirable to provide a robust backup positioning system, to enable accurate vehicle positioning when GNSS is unavailable.

Figure 3:
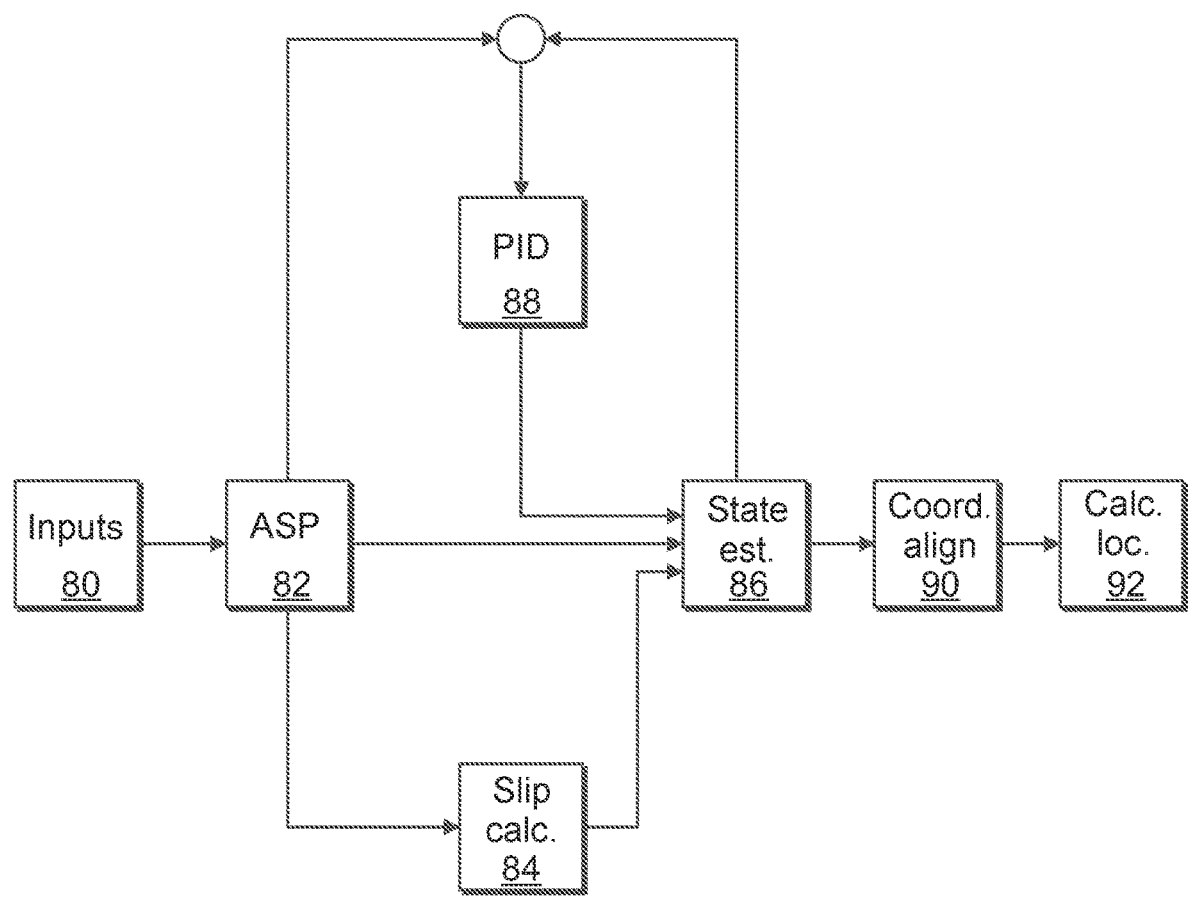
FIG. 3 is a block diagram representing a control scheme for a vehicle according to an embodiment of the present disclosure.

Referring now to FIG. 3, a method of estimating vehicle position according to the present disclosure is illustrated in block diagram form. In an exemplary embodiment, the method is performed by the controller 22, e.g. as part of the localization and mapping module 40 and/or the positioning module 42. Any specific equations discussed below are merely exemplary and are not intended to limit the scope of the present disclosure.

Vehicle inputs 80 are received, e.g. via one or more sensors 26. In an exemplary embodiment, the vehicle inputs 80 include longitudinal velocity of the vehicle 12, yaw rate of the vehicle 12, and a steering angle of the steering system 16.

Ackermann steering parameters 82 are then calculated. The Ackermann steering parameters include a left road wheel angle and a right road wheel angle. The Ackermann steering parameters are calculated based on the vehicle inputs 80, in conjunction with vehicle-specific parameters. The vehicle-specific parameters refer to parameters which are generally constant for a given vehicle model, including (but not limited to) front and/or rear cornering coefficient(s), moment of inertia, mass distribution, track width and wheelbase, and steering geometry such as toe angle of the steering system 16. In an exemplary embodiment, this calculation may be expressed as:

$$\text{steering ratio} = A_0 + A_1\theta_{SW} + A_2\theta_{SW}^2 + B_0\cos\left(\frac{2*(\theta_{SW} - C)}{57.3}\right)$$

where $\theta_{SW}$ refers to a steering wheel angle, and $A_0$, $A_1$, $A_2$, $B_0$, and C are constants based on the above-described parameters.

A tire slip angle calculation 84 is thereafter performed based on the vehicle inputs 80 and the above-described vehicle-specific parameters. In an exemplary embodiment, the tire slip angle calculation estimates tire slip angles for all vehicle wheels based on inputs including the longitudinal velocity, lateral velocity, and yaw rate. In an exemplary embodiment, the tire slip angle calculation may be expressed as:

$$\alpha_{L1} = \delta_f - \operatorname{atan}\left[\frac{v_y + L_f r}{u - 0.5rw}\right] + T_{L1};$$

$$\alpha_{R1} = \delta_f - \operatorname{atan}\left[\frac{v_y + L_f r}{u + 0.5rw}\right] + T_{R1};$$

$$\alpha_{L2} = \delta_r - \operatorname{atan}\left[\frac{v_y + L_r r}{u - 0.5rw}\right] + T_{L2};$$

$$\alpha_{R2} = \delta_r - \operatorname{atan}\left[\frac{v_y + L_r r}{u + 0.5rw}\right] + T_{R2};$$

$$\alpha_f = \frac{1}{2}(\alpha_{L1} + \alpha_{R1});$$

$$\alpha_r = \frac{1}{2}(\alpha_{L2} + \alpha_{R2});$$

$$F_{yf} = c_{\alpha_f}\alpha_f;$$

$$F_{yr} = c_{\alpha_r}\alpha_r$$

where $\alpha_{L1}$, $\alpha_{R1}$, $\alpha_{L2}$, and $\alpha_{R2}$ are slip angles of front left, front right, rear left, and rear right tires, respectively; $\delta_f$ and $\delta_r$ are front and rear road wheel angles, respectively; vy is the lateral velocity of the vehicle; $L_f$ and $L_r$ are the distance from the vehicle center of gravity to the center of front and rear axles, respectively; r is yaw rate of the vehicle; u is the longitudinal velocity of the vehicle; w is the track width of the vehicle; $T_{L1}$, $T_{R1}$, $T_{L2}$, and $T_{R2}$ are toe angles of front left, front right, rear left, and rear right tires, respectively; $\alpha_f$ and $\alpha_r$ are average front and rear slip angles, respectively; $F_{yf}$ and $F_{yr}$ are lateral forces at front and rear axles, respectively; and $c_{\alpha_f}$ and $c_{\alpha_r}$ are cornering stiffness parameters for front and rear axles, respectively.

A state estimator 86 thereafter estimates vehicle state variables. In an exemplary embodiment, the state variables include longitudinal position, lateral position, yaw rate, and lateral velocity. The state estimator may be based on a so-called "bicycle model" of vehicle kinematics, or any other suitable model for estimating such parameters. In an exemplary embodiment, the state estimator may be expressed as:

$$\begin{bmatrix} dP_y \\ dP_r \\ dL_x \\ dL_y \end{bmatrix} = \begin{bmatrix} 0 & -\left(\frac{mU}{I_{ZZ}}\right) & 0 & 0 \\ 0 & 0 & 0 & 0 \\ -\left(\frac{\sin\theta_v}{m}\right) & 0 & 0 & 0 \\ \left(\frac{\cos\theta_v}{m}\right) & 0 & 0 & 0 \end{bmatrix}$$

$$\begin{bmatrix} P_y \\ P_r \\ L_x \\ L_y \end{bmatrix} + \begin{bmatrix} \cos\delta & 1 \\ L_f\cos\delta & -L_r \\ 0 & 0 \\ 0 & 0 \end{bmatrix} \begin{bmatrix} F_{yf} \\ F_{yr} \end{bmatrix} + \begin{bmatrix} 0 \\ 0 \\ u\cos\theta_v \\ u\sin\theta_v \end{bmatrix}$$

where $P_y$ and $P_r$ are lateral linear momentum and yaw angular momentum of the vehicle, respectively; $L_x$ and $L_y$ are x- and y-coordinates of the vehicle, respectively; $\theta_v$ is the yaw angle of the vehicle; m is vehicle mass; $I_{ZZ}$ is the moment of inertia of the vehicle; δ is an average road wheel angle of the vehicle, e.g. an average of $\delta_f$ and $\delta_r$; and u, $F_{yf}$, $F_{yr}$, $L_f$, and $L_r$ are as discussed above.

A PID controller 88 is implemented to minimize error in the state estimator 86. The PID controller utilizes, as its input, a difference between the estimated yaw rate output by the state estimator and the measured yaw rate from the input 80. The tuning constants of the P, I, and D terms may be obtained by any appropriate tuning technique, including (but not limited to) machine learning. In an exemplary embodiment, the tuning constant of the D term is 0, resulting in a PI control scheme. The output of the PID controller 88 is provided to the state estimator 86 as a correction factor, increasing precision of the estimated states.

A coordinate alignment calculation 90 is optionally thereafter performed to convert vehicle position into an appropriate coordinate system. Such a calculation may be used when, for example, the state estimator 86 calculates a vehicle location in a vehicle-centric coordinate system while path planning is performed in a global coordinate system. However, in some embodiments a consistent coordinate system may be used throughout the ADS 24, obviating the coordinate alignment calculation 90.

A calculated vehicle location 92 is thereafter output. As will be discussed in further detail below, the calculated vehicle location may be used for path planning purposes to more precisely navigate the vehicle 12 according to the desired route.

Figure 4:
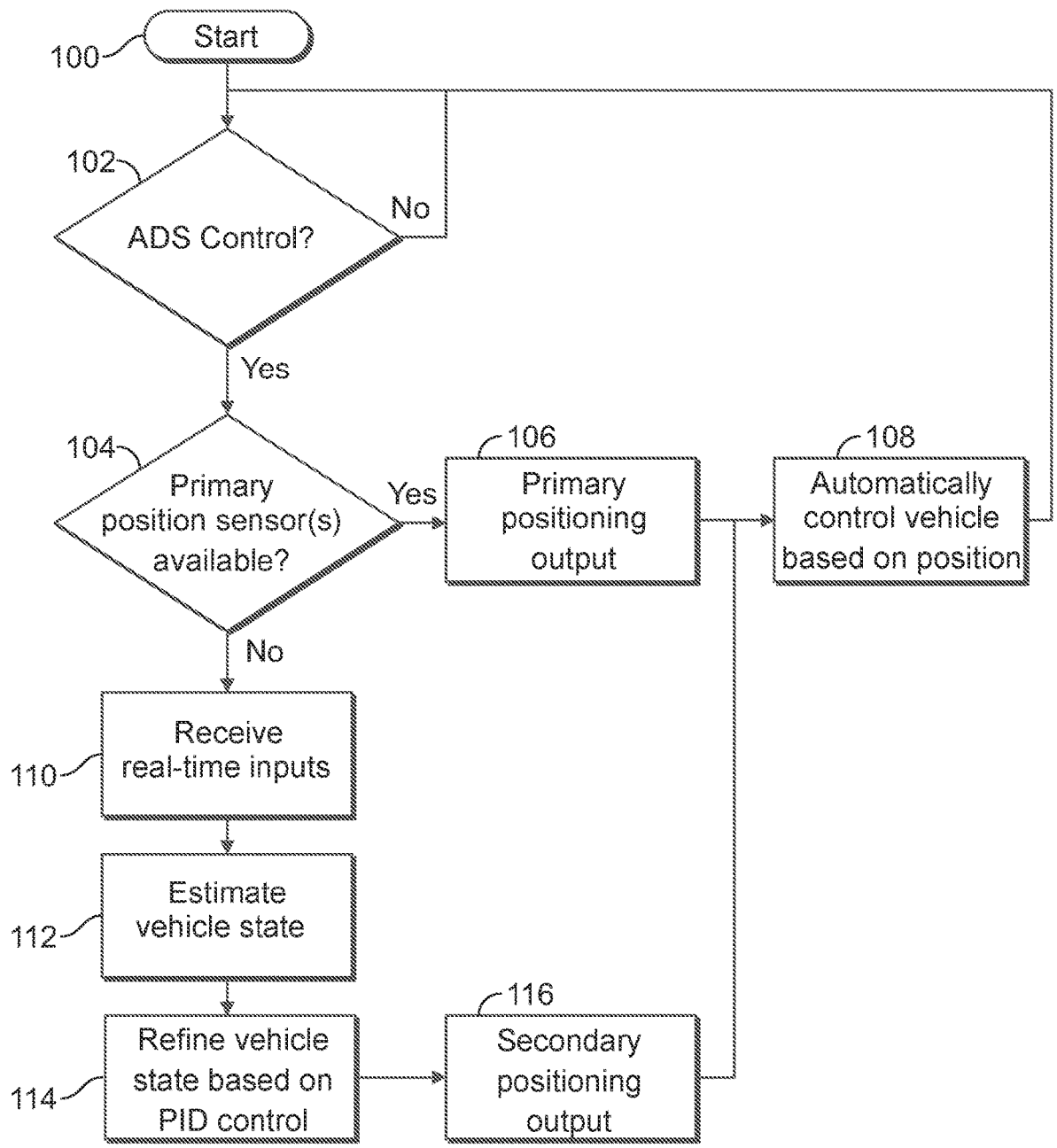
FIG. 4 is a flowchart representation of a method of controlling a vehicle according to an embodiment of the present disclosure.

Referring now to FIG. 4, a method of controlling a vehicle according to an embodiment of the present disclosure is illustrated in flowchart form. The method may be performed by the controller 22, e.g. as part of the ADS 24. Aspects of the method may be embodied in the localization and mapping module 40 and/or the positioning module 42. The algorithm begins at block 100.

A determination is made of whether the vehicle is under ADS control, as illustrated at operation 102. This determination may be satisfied in response to one or more aspects of vehicle driving, e.g. vehicle steering, being controlled automatically by the ADS.

In response to the determination of operation 102 being negative, e.g. when the vehicle is under manual control of an occupant of the vehicle or under the control of a remote operator, control returns to operation 102. The algorithm thereby does not proceed unless and until the vehicle is under ADS control.

A determination is then made of whether one or more primary position sensors are available, as illustrated at operation 104. This determination may be satisfied when all sensors 26 relied upon by the primary positioning algorithm of the ADS 24, e.g. a GNSS sensor, camera module, RADAR module, LiDAR module, or any combination thereof, are available and providing satisfactory data.

In response to the determination of operation 104 being positive, i.e. all of the sensors 26 are available, then a primary positioning output is used, as illustrated at block 106. This may be, e.g., the positioning output of a default positioning algorithm of the positioning module 42.

The vehicle is subsequently automatically controlled to achieve a desired path based on the positioning output, as illustrated at block 108. This may comprise automatically controlling one or more of the actuators 30 to achieve the desired path, e.g. the output from the path planning module. Control then returns to operation 102.

Returning to operation 104, in response to the determination being negative, i.e. one or more of the primary position sensors being unavailable, then real-time inputs are received, as illustrated at block 110. In an exemplary embodiment, these are generally the same inputs as discussed with respect to FIG. 3, e.g. the inputs 80.

A vehicle state is estimated, as illustrated at block 112. In an exemplary embodiment, this is generally the same estimation as discussed with respect to FIG. 3, e.g. the state estimation 86.

The vehicle state is then refined based on a PID controller, as illustrated at block 114. In an exemplary embodiment, this controller is arranged generally as discussed with respect to FIG. 3, e.g. as the PID controller 88.

A secondary positioning output is obtained, as illustrated at block 116. In an exemplary embodiment, the secondary positioning output is obtained generally as discussed with respect to FIG. 4, e.g. as with the output 92.

Control then proceeds to block 108 and the vehicle is automatically controlled to achieve the desired path based on the positioning output. The algorithm thereafter returns to operation 102.

As may be seen, the algorithm thereby obtains a position via the backup positioning algorithm discussed herein whenever one or more primary position sensor is unavailable.

As may be seen, the present disclosure provides a system and method for calculating vehicle position using an accurate and computationally-efficient control. Moreover, the present disclosure provides a method for automatically using such a control when desirable based on the condition of one or more primary positioning sensors, thereby increasing robustness and reliability of the system and, in turn, increasing customer satisfaction.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A ground vehicle comprising:
   an actuator configured to control vehicle steering;
   a sensor configured to detect a yaw rate of the vehicle; and
   a controller configured to estimate a yaw rate and lateral velocity of the vehicle via a vehicle dynamics model based on a measured longitudinal velocity of the vehicle, calculated road wheel angles of the vehicle, and estimated tire slip angles of the vehicle, the controller being further configured to receive a measured yaw rate from the sensor, the controller being further configured to calculate a difference between the measured yaw rate and the estimated yaw rate, the controller being further configured to apply a model correction to the vehicle dynamics model using a PID controller based on the difference, the controller being further configured to estimate a vehicle position based on the estimated lateral velocity and the measured longitudinal velocity, the controller being further configured to automatically control the actuator based on the vehicle position.

2. The vehicle of claim 1, further comprising a GNSS receiver configured to provide a position of the vehicle, wherein the controller is configured to estimate the vehicle position based on the estimated lateral velocity and the measured longitudinal velocity in response to a position from the GNSS receiver being unavailable.

3. The vehicle of claim 1, wherein the PID controller is a PI controller.

4. A method of controlling a ground vehicle, comprising:
providing the vehicle with an actuator configured to control vehicle steering, at least one sensor configured to detect a yaw rate of the vehicle and a longitudinal velocity of the vehicle, and a controller in communication with the sensor and the controller;
receiving, via the at least one sensor, a measured longitudinal velocity and a measured yaw rate;
estimating, via the controller, a yaw rate and lateral velocity of the vehicle using a vehicle dynamics model based on the measured longitudinal velocity, calculated road wheel angles of the vehicle, and estimated tire slip angles of the vehicle;
calculating, via the controller, a difference between the measured yaw rate and the estimated yaw rate;
applying, via the controller, a model correction to the vehicle dynamics model using a PID controller based on the difference;
estimating, via the controller, a vehicle position based on the estimated lateral velocity and the measured longitudinal velocity; and
automatically controlling the actuator, via the controller, based on the vehicle position.

5. The method of claim 4, further comprising providing the vehicle with a GNSS receiver configured to provide a position of the vehicle, wherein the estimating the vehicle position based on the estimated lateral velocity and the measured longitudinal velocity is in response to a position from the GNSS receiver being unavailable.

6. The method of claim 4, wherein the PID controller is a PI controller.

7. The method of claim 4, further comprising identifying tuning constants of the PID controller via machine learning.

8. A control system for a vehicle, the control system comprising:
a first calculation module configured to receive a measured steering angle and determine a calculated road wheel angle based on the measured steering angle;
a second calculation module configured to determine a calculated tire slip angle based on a measured longitudinal velocity, a measured yaw rate, and a calculated lateral velocity;
a vehicle dynamics model configured to determine a calculated yaw rate, the calculated lateral velocity, and a calculated position of the vehicle based on the measured longitudinal velocity of the vehicle, the calculated road wheel angle, and the calculated tire slip angle;
a PID controller configured to apply a model correction to the vehicle dynamics model based on a difference between the measured yaw rate and the calculated yaw rate;
a path planning module configured to determine a vehicle path to be followed based on the calculated position of the vehicle; and
a vehicle control module configured to automatically control a steering actuator based on the vehicle path.

9. The control system of claim 8, further comprising a vehicle steering system, wherein the steering actuator is operable to automatically control the vehicle steering system without operator input.

10. The control system of claim 8, further comprising a GNSS receiver configured to provide a position of the vehicle, wherein the path planning module configured to determine a vehicle path to be followed based on the calculated position of the vehicle in response to a position from the GNSS receiver being unavailable.

11. The control system of claim 8, wherein the PID controller is a PI controller.

12. The control system of claim 8, further comprising a coordinate alignment module configured to convert the calculated position of the vehicle from a first coordinate system to a second coordinate system.

* * * * *